Jan. 1, 1924

J. F. CULLIN

ARMATURE WINDING TESTING MECHANISM

Filed Jan. 7, 1920    2 Sheets-Sheet 1

1,479,284

INVENTOR
Jasper F. Cullin
BY
Edward N. Pagelsen
ATTORNEY

Patented Jan. 1, 1924.

1,479,284

UNITED STATES PATENT OFFICE.

JASPER F. CULLIN, OF DETROIT, MICHIGAN, ASSIGNOR, BY MESNE ASSIGNMENTS, TO WILLIAM J. HARTWIG, OF DETROIT, MICHIGAN.

ARMATURE-WINDING-TESTING MECHANISM.

Application filed January 7, 1920. Serial No. 349,859.

*To all whom it may concern:*

Be it known that I, JASPER F. CULLIN, a citizen of the United States, and residing at Detroit, in the county of Wayne and State of Michigan, have invented a new and Improved Armature-Winding-Testing Mechanism, of which the following is a specification.

This invention relates to means adapted to engage the commutator segments of the armatures of electric dynamos and motors to determine whether these segments or the windings connected thereto are grounded or short-circuited, and its object is to provide a support for the armature shaft, a series of pins adapted to contact with the commutator segments and connections between them and a series of electric light bulbs so that the conditions of the insulations may be indicated by said lights.

This invention consists in a pair of supports whereon the shaft of an armature may be rotated, a strong electro-magnet capable of inducing sufficient electric current in the windings of the armature to cause low voltage lamps to burn, means adapted to contact with the segments of the commutator to which these coils are connected, and electric circuits between the contact means and said lamps.

It further consists in the novel spacing and connections of these contact points so that the different conditions which are to be determined by the lights may be indicated.

It also consists in the details of construction illustrated in the accompanying drawings and particularly pointed out in the claims.

Figure 1:
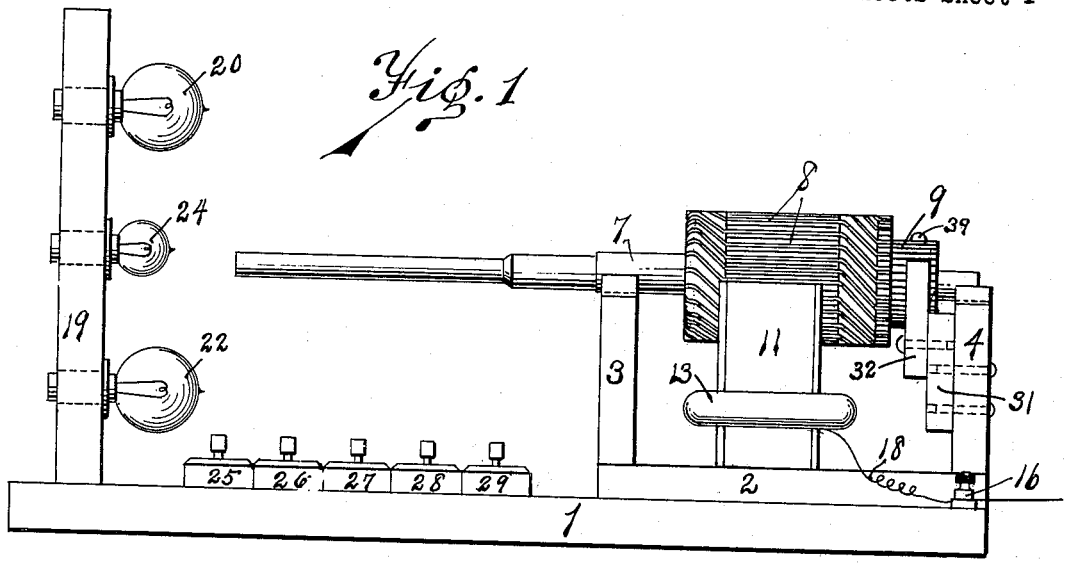
Figure 2:
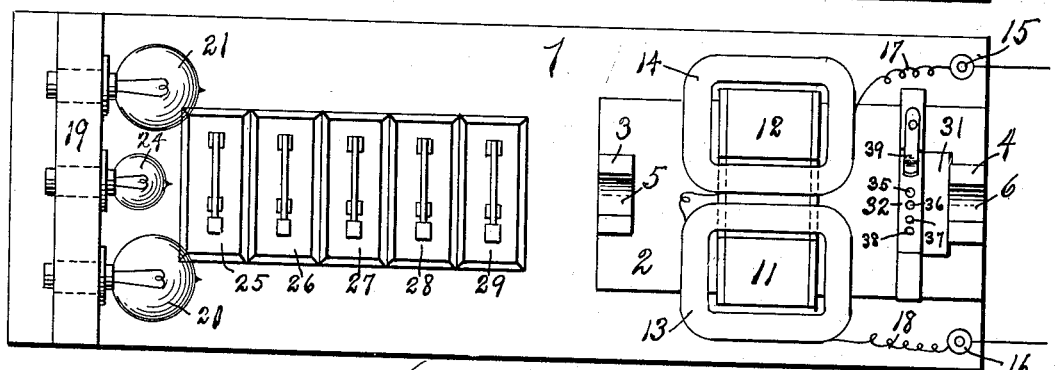
Figure 3:
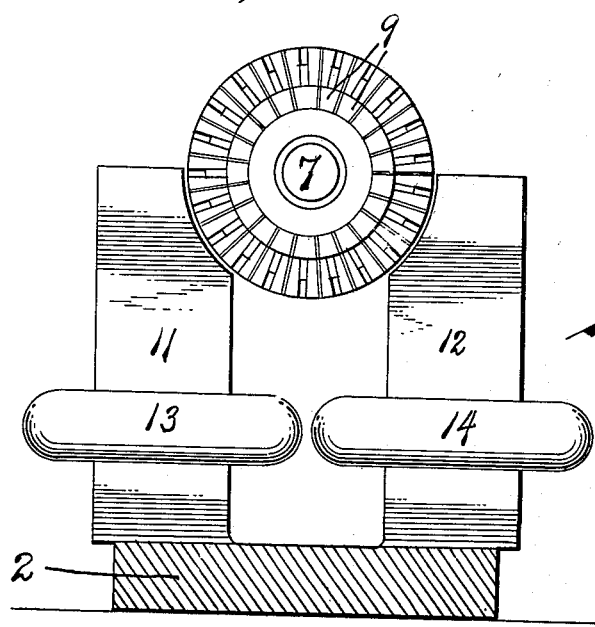
Figure 4:
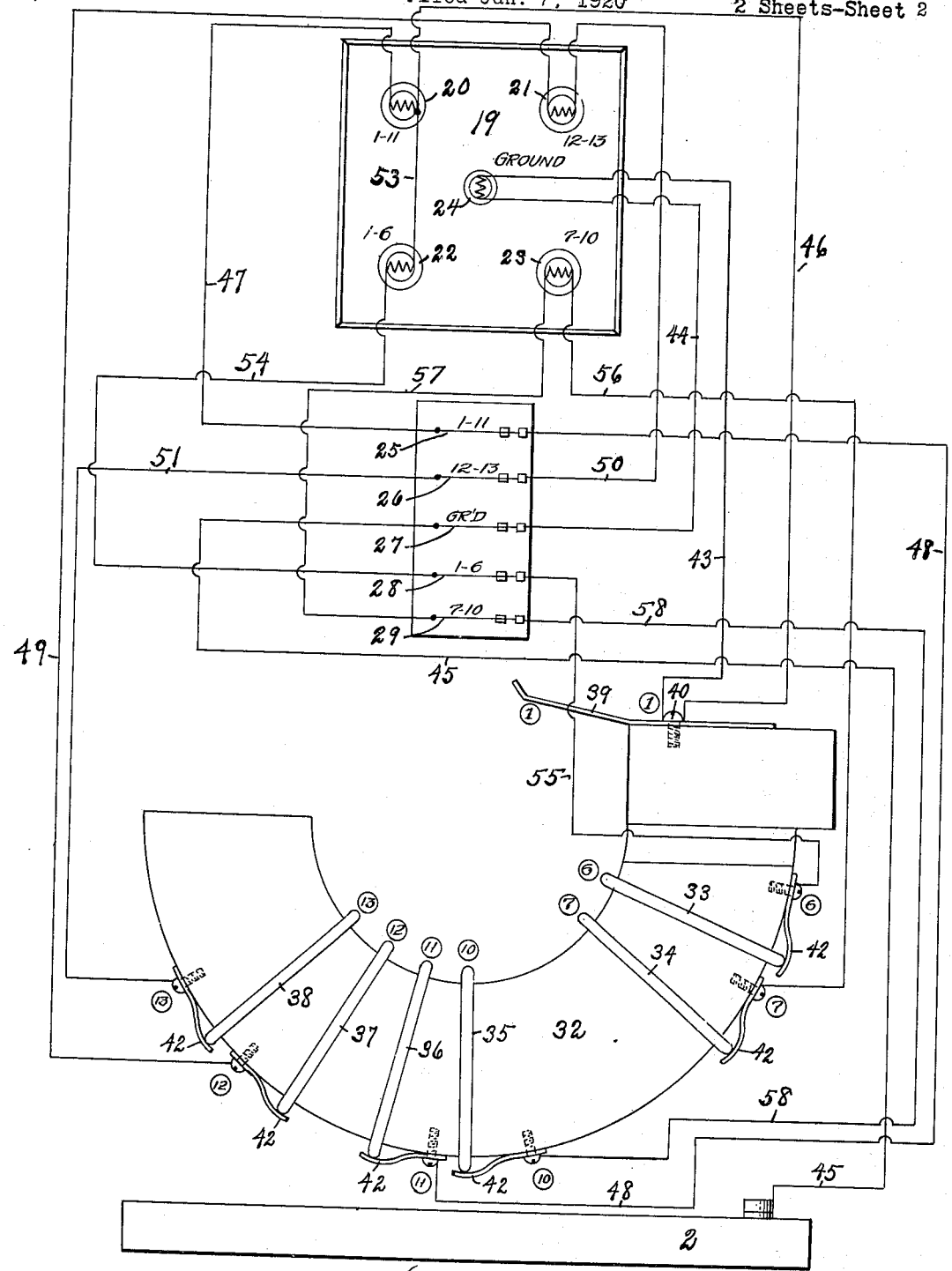

In the drawings, Fig. 1 is a side elevation and Fig. 2 is a plan of this improved testing device. Fig. 3 is an elevation of the electro-magnet for inducing the currents for the lamps in the windings of the armature. Fig. 4 is a diagrammatic view illustrating the circuits.

Similar reference characters refer to like parts throughout the several views.

The base 1 of this device may be of wood, and on it is mounted a plate 2 of iron from which arise the pedestals 3 and 4 which are provided with V-grooves 5 and 6 to receive the armature shaft 7. The armature may be of any desired construction and is provided with windings 8 which connect to the segments 9 of the commutator in the usual manner. In this drawing the commutator is shown to have twenty-one segments, although this may be varied as desired.

Extending up from the plate 2 are two poles 11 and 12 of a strong electro-magnet on which are mounted the coils 13 and 14 which are connected to the binding posts 15 and 16 by means of wires 17 and 18, and to any desired source of alternating current. The current in the coils 13 and 14 induces currents in the windings 8 of the armature, and a series of lamps are provided to indicate the presence and characters of these induced currents.

On the opposite end of the board 1 from the pedestal 4 is a board 19 on which are mounted the lamps 20 to 24 inclusive. The circuits to these lamps may be controlled by the switches 25 to 29 inclusive, but the switches may be omitted if desired. Mounted on the pedestal 4 and spaced therefrom by the block 31 is a contact carrier 32, preferably of insulating material. In this contact carrier 32 are slidably mounted a series of contact pins 33 to 38 inclusive and secured to this carrier 32 is a contact 39 which may be swung on the screw 40, over to one side to permit the placing or removal of an armature. Each of the pins 33 to 38 inclusive is supported in position by a conducting spring 42 to which is connected one or the other of the circuit wires to be hereinafter explained. Each one of these contacts is given an encircled number in the drawing which corresponds to the commutator segment with which the pin engages, counting to the right and beginning with the segment with which the contact 39 is in engagement.

When the armature is in position with the commutator segments in engagement with contact 39 and the pins 33 to 38 inclusive, as indicated in Fig. 1, the following conditions arise. If the winding to which the first commutator segment is connected, or the first commutator segment is grounded, the current will flow from this segment by way of contact 39, circuit wire 43 to the "ground" lamp 24, circuit wire 44, switch 27, wire 45, to the base plate 2 and over the pedestals 3 and 4 to the shaft 7 and to the point of grounding of either the winding or the segment. Therefore, if this lamp 24 is lighted, it is a positive indication that there is a ground in the armature and the segment and winding can easily be discovered for it will be the one with which the contact 39 engages while the lamp 24 is burning.

In ordinary armatures having twenty-one windings, the commutator segments 1 and 11 are connected by a single winding, the segments 12 and 13 are connected by two windings, the segments 1 and 6 are connected by ten windings, while the segments 7 and 10 are connected by six windings. As the normal induced current in each one of these windings should be practically the same, because these windings are all connected, the current passing to the lamps will be directly in proportion to the number of coils which are cut out by means of the contacts. As these lamps 20 to 23 inclusive are all of the same character, they respond to the current which flows through them and the lamp 22 will be brighter than the lamp 23 and very much brighter than the lamps 21 and 20, the last named being normally the dullest of all four. But should a short circuit develop between any one of these armature windings and any other, less current will flow to one or the other of these lamps.

An unbroken winding between the first and eleventh segments completes the path from the contact 39, over wire 46, to lamp 20, wire 47, switch 25 and wire 48 to contact pin 36.

The double windings between the contact pins 37 and 38 will close the circuit over the pin 37, wire 49, lamp 21, wire 50, switch 26, wire 51 and pin 38.

There are ten windings between the first and sixth commutator segments and they complete the circuit between the contact 39, wires 46, and 53, lamp 22, wire 54, switch 28 and wire 55 to the pin 33.

Six windings connect the pins 34 and 35 by way of the wires 56, lamp 23, wire 57, switch 29, and wire 58.

When the operator places an armature shaft on the pedestals 3 and 4 and whirls it, all the lights except 24 should remain constant, and he can then be certain that there are no short circuits and no grounds. But if any one of these lights varies, one or another of the windings is short-circuited, either within itself or on one of the other windings. It is then a simple matter to slowly turn the armature until by means of the light 20 one determines in which winding the ground occurs, for the light will be slightly different when the commutator segments to which this imperfect winding is connected engage the contacts 39 and 36. In a similar manner when a short-circuit occurs between two adjacent windings they may soon be located by the lamp 21 which is always in circuit with two adjacent windings. Short-circuits at the ends of the armature may be between widely separated windings but all may be detected at once by the various lights.

The details of construction and the arrangements of the parts may all be varied by those skilled in the art without departing from the spirit of my invention as set forth in the following claims.

I claim:—

1. In a device for testing armatures, the combination of means for rotatably supporting an armature shaft, means to induce electric currents in the windings of the armature, a series of pairs of contacts adapted to simultaneously engage the segments of the commutator of the armature, an electric lamp in the circuit of each pair, and wires connecting these lamps and contacts.

2. In a device for testing the insulations of armatures, the combination of means to rotatably support an armature shaft, an electro-magnet having poles adjacent the windings of the armature to induce currents therein, a series of pairs of contacts adapted to engage separated segments of the commutator of the armature, an indicating device for each pair of contacts, and electric circuits between said contacts and said indicating devices.

3. In a device for testing armatures, the combination of a pair of pedestals having V-grooves at their upper ends to receive the armature shafts, a series of electric lamps, a contact carrier and a series of contact pins slidably mounted therein and means to press the contacts into engagement with segments of the commutator, means to induce electric currents in the windings of the armature, and electric circuits connecting the lamps and contacts.

4. In a device for testing armatures, the combination of a pair of pedestals having V-grooves at their upper ends to receive the armature shafts, a series of electric lamps, a contact carrier and a series of contact pins slidably mounted therein and means to press the contacts into engagement with segments of the commutator, means to induce electric currents in the windings of the armature, and electric circuits connecting the lamps and contacts, said current inducing means comprising an electro-magnet whose poles are recessed so as to receive the armature and coils for alternating current mounted on the poles.

5. In a device for testing armatures, the combination of means for rotatably supporting an armature and the shaft therefor on which is mounted a commutator embodying segments to which the windings of the armature are connected, an electro-magnet adjacent the armature when thus supported to induce currents in the windings thereof, means to contact with two commutator segments, means connected to said contacts to indicate variations in said induced currents in the armature windings, and conductors connecting said indicating means with said contacting means.

JASPER F. CULLIN.